Nov. 21, 1944.  C. E. TACK  2,363,453
RAILWAY BRAKE
Filed June 15, 1942  2 Sheets-Sheet 1
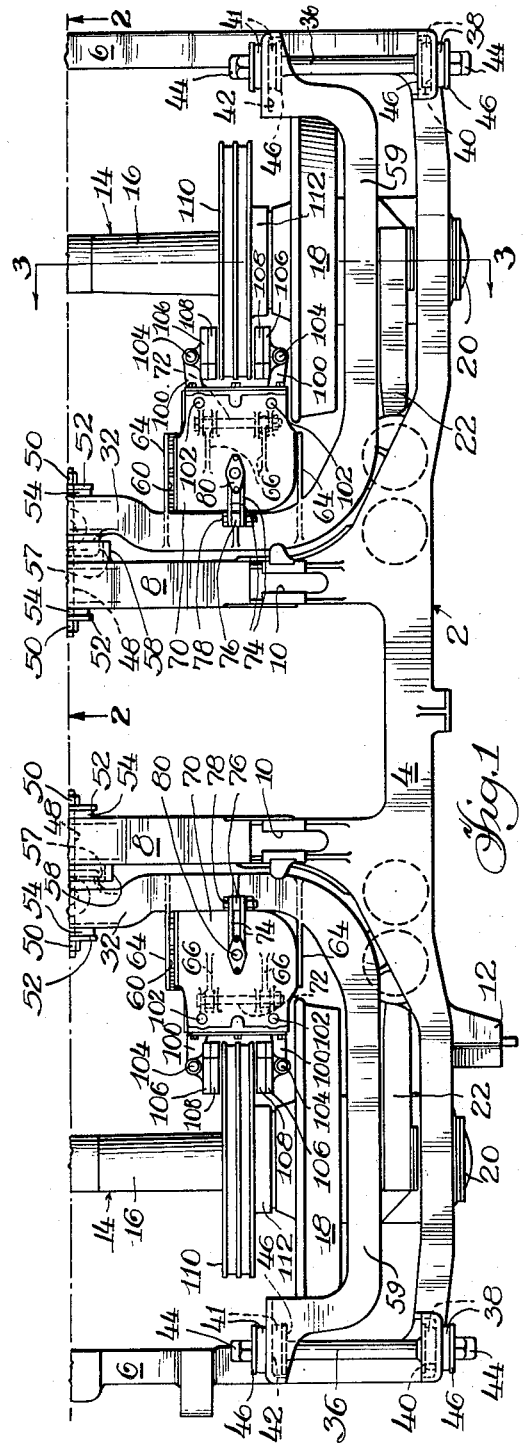
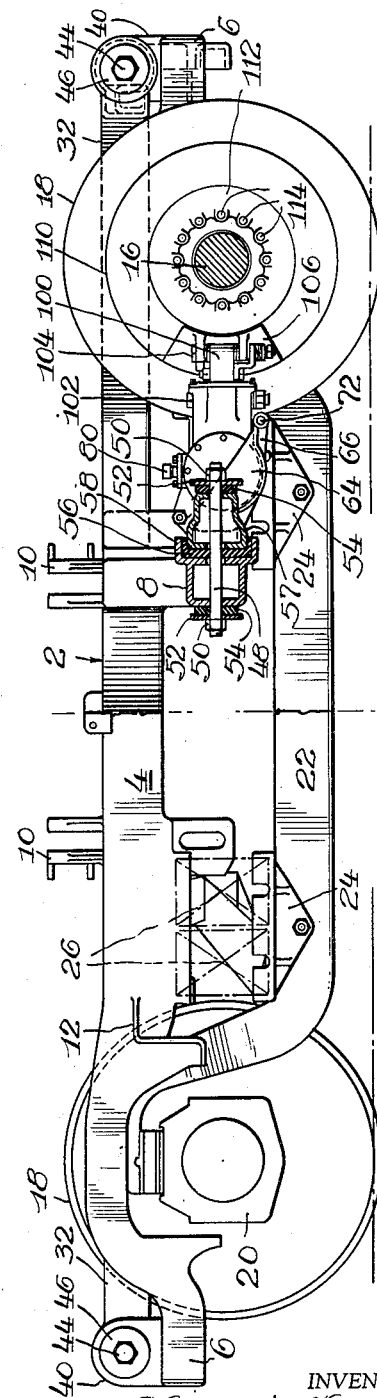
INVENTOR.
Carl E. Tack
BY Nov. 21, 1944. C. E. TACK 2,363,453
RAILWAY BRAKE
Filed June 15, 1942 2 Sheets-Sheet 2
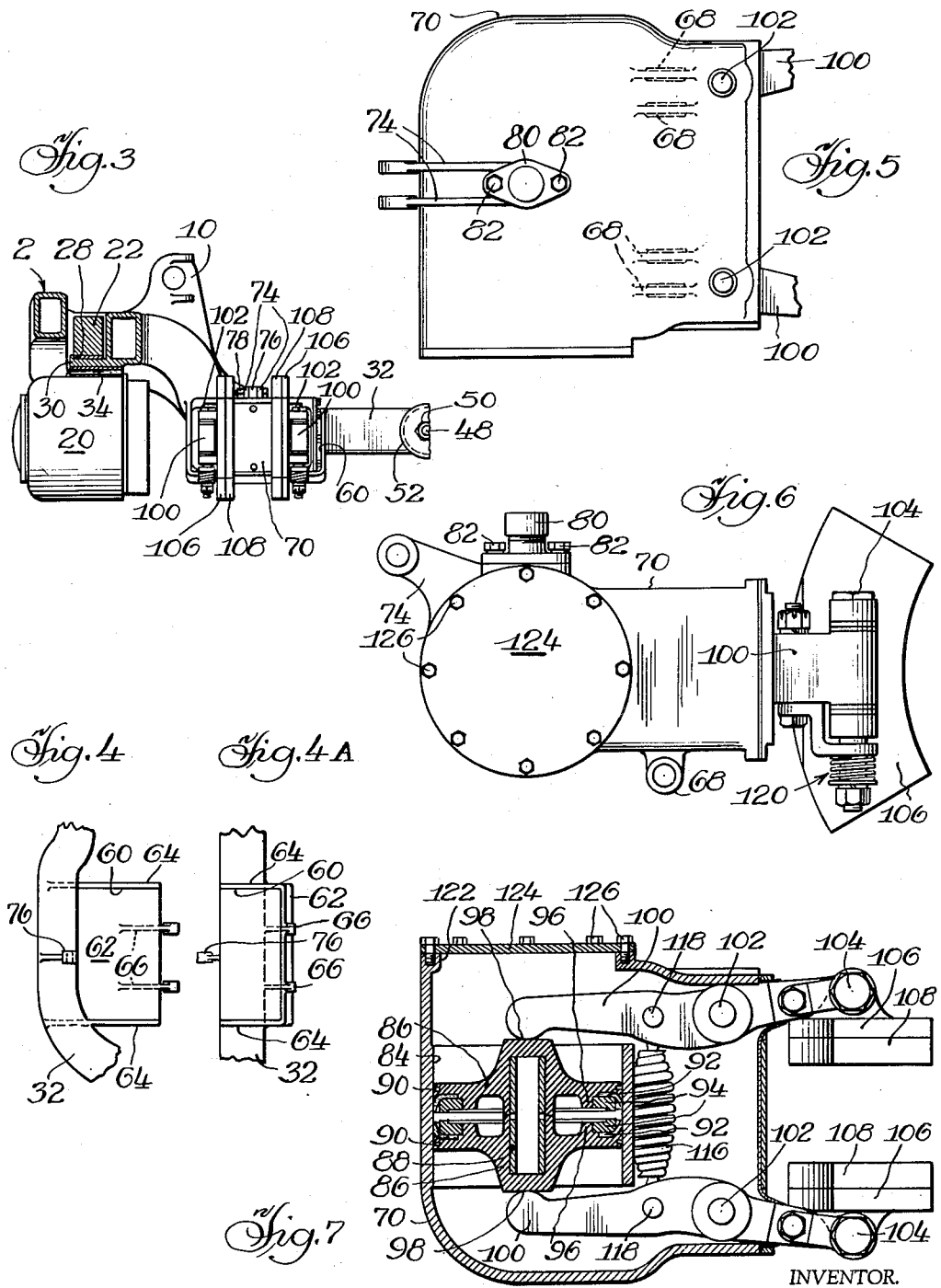
INVENTOR.
Carl E. Tack
BY Orin O. B. Garner
Atty Patented Nov. 21, 1944

2,363,453

UNITED STATES PATENT OFFICE 2,363,453

RAILWAY BRAKE

Carl E. Tack, Chicago, Ill., assignor to American Steel Foundries, Chicago, Ill., a corporation of New Jersey Application June 15, 1942, Serial No. 447,084

7 Claims. (Cl. 188—153)

My invention relates to a brake arrangement for a railway car truck and especially to a design commonly called off-wheel wherein brake discs are supported to rotate with the wheel and axle assemblies to afford braking surfaces independently of the tread surfaces of the wheel.

The general object of my invention is to devise an off-wheel brake arrangement wherein braking discs are supported to rotate with each wheel and axle assembly and a brake frame is supported from the ends of the assembly and supports levers with brake shoes for frictional engagement with opposite sides of each brake disc.

A different object of my invention is to provide a brake frame such as above described so mounted that the shoes carried thereon may closely follow lateral movements of the wheel and axle assembly.

My invention comprehends an arrangement in which a C-shaped brake frame is supported from each wheel and axle assembly and comprises end portions extending longitudinally of the truck frame beyond said assembly, said end portions being afforded a resilient torque connection to the truck frame and said brake frame being afforded an additional intermediate torque connection to the truck frame, each of said torque connections comprising a rigid torque rod resiliently connected to the brake frame and to the truck frame.

A specific object of my invention is to design a brake frame such as above described in which cylinder housings are removably supported adjacent opposite ends of said brake frame, said housings affording a pivotal fulcrum for the associated brake levers and said levers supporting friction means for engagement with opposite sides of the associated brake discs as above described.

A further object of my invention is to design a brake frame of the above described type comprising a cylinder housing pocket adjacent each end thereof, said pocket receiving therewithin an associated cylinder housing, said housing being connected to the brake frame by means of a substantially horizontal pin securing the bottom of the housing to the brake frame pocket and adapted to be placed in quadruple shear upon actuation of the associated friction shoes, and said housing being afforded a further connection at the top thereof to the brake frame.

In the drawings, Figure 1 is a fragmentary top plan view of a railway car truck embodying my invention, only one side of the truck being shown inasmuch as the structure is similar at opposite sides thereof.

Figure 2 is a side view of the structure shown in Figure 1, the left half thereof being a view in elevation, and the right half thereof being a sectional view taken in the longitudinal vertical plane indicated by the line 2—2 of Figure 1.

Figure 3 is a sectional view taken in the transverse vertical plane indicated by the line 3—3 of Figure 1, the wheel and axle assembly and the brake disc or rotor being removed to clarify the showing.

Figures 4 and 4A are respectively a plan view and an elevational view of the brake frame cylinder housing pocket embodied at each end of each brake frame shown in Figure 1.

Figures 5, 6, and 7 show in detail one of the cylinder housings utilized in the arrangement as well as the brake mechanism associated with said housing, Figure 5 being a top plan view of the housing with the brake levers broken off, Figure 6 being a side elevation of the cylinder housing and associated brake mechanism, and Figure 7 being a sectional view taken in a horizontal plane bisecting the cylinder housing, the brake levers and friction shoes being shown in elevation.

In each of said figures certain details may be omitted where they are more clearly seen in other views.

Describing my invention in detail, the truck frame generally designated 2 comprises side rails 4, 4, end rails 6, 6 and the spaced transoms 8, 8, said transoms being formed with support means generally designated 10, 10 formed and arranged for the support of swing hangers (not shown) affording support in the usual manner for a bolster member (not shown) upon which may be mounted a car body, as will be clearly understood by those skilled in the art. On the outbroad side of each side rail 4 is formed a bracket 12 affording connection for a draft rod (not shown), said rod being connected to the outboard end of the bolster.

The truck 2 is supported adjacent each end thereof on a wheel and axle assembly 14 in a manner hereinafter more fully described, said wheel and axle assembly comprising the axle 16 with a wheel 18 on each end thereof, the axle 16 extending outboard each wheel and being journaled in a journal box 20 of usual form, said journal box affording support for the adjacent end of the equalizer 22 as hereinafter more fully described, the equalizer 22 comprising spring seats 24, 24 on opposite ends thereof, each of said spring seats supporting and positioning the coil springs 26, 26 diagrammatically indicated at the left in Figure 2, said coil springs being seated at the upper ends thereof against spring seats formed on the side rail 4 and said springs affording support for the truck frame 2 in the usual manner, as will be clearly apparent.

The equalizer 22, as will be understood from a consideration of Figure 3, is seated at each end thereof at 28 on a flange 30 formed on the brake frame 32, said flange being supported on the adjacent journal box 20 and spaced therefrom by shim means 34 of usual form.

It will be apparent from a consideration of Figure 1 that the brake frame 32 is generally C-shaped and extends longitudinally of the truck frame 2 outwardly of the associated journal boxes for torque connection at the ends thereof to the truck frame, each of said torque connections comprising a torque rod 36 resiliently connected to the truck frame at one end thereof by means of the spaced resilient pads 38, 38 compressed against the opposite sides of the upstanding flange 40 on the truck frame, and said torque rod being resiliently connected at the opposite end thereof by means of resilient pads 41, 41 compressed against opposite sides of the vertical web 42 formed on the associated end of the brake frame 32, said torque rod being provided with a nut 44 on each end thereof for compressing the associated pads 38, 38 and 41, 41 between the spaced washers 46, 46. The brake frame 32 is also afforded a torque connection intermediate its ends to the associated transom 8, said connection comprising a rod 48 extending through the transom and through the brake frame in a horizontal plane, said rod being provided at each end thereof with a nut 50 for tightening a washer 52 against a resilient pad 54 of annular form and sleeved over the rod 48, one of said pads 54 being compressed against the transom 8 and the other of said pads being compressed against the brake frame 32. Compressed between the adjacent sides of the transom 8 and the brake frame 32 is a cup-like resilient pad 56, said pad embracing a cylindrical projection 57 on the brake frame 32 and being confined by the annular flange 58 on the transom.

It will be apparent to those skilled in the art that the three point connection above described of the brake frame to the truck frame permits the brake frame to move with respect to the truck frame in conjunction with movement of the associated wheel and axle assembly 14 with respect to the truck frame 2 which is resiliently supported from the wheel and axle assembly as above described.

The brake frame 32 is provided adjacent each end portion or torque arm 59 thereof with a pocket 60 defined by the bottom web 62 and the spaced upstanding webs 64, 64, said bottom web having an arcuate contour as will be understood from a consideration of Figures 2 and 4A in order to conform to the shape of the cylinder housing positioned and secured in the pocket 60 as hereinafter more fully described. Formed on the bottom of the web 62 are the spaced depending flanges 66, 66, the ends of said flanges projecting beyond the edge of the web 62 for reception between the spaced depending lugs 68, 68 on the cylinder housing 70, the flanges 66, 66 being secured to said lugs 68, 68 by means of a pin 72 extending through said flanges and said lugs and adapted to be placed in quadruple shear upon actuation of the brake mechanism. The cylinder housing 70 is also provided with the spaced lugs 74, 74 receiving therebetween the lug 76 on the top of the brake frame 32 and connected thereto by means of the bolt and nut assembly 78.

It may be noted that each cylinder housing is provided with a nozzle 80 secured thereto as at 82, 82, said nozzle providing convenient attaching means for an air supply line whereby air may be transmitted to the air cylinder 84 (Figure 7) integrally formed within the cylinder housing 70. Received within the cylinder 84 are the pistons 86, 86, said pistons being slidably engaged with the tube 88 sleeved in the adjacent sides of said pistons, said tube 88 being effective to maintain the pistons in alignment with each other during actuation thereof as will be clearly apparent. Each piston is provided with a lubricating ring 90 engaging the inner surface of the cylinder 84 for lubrication thereof as will be clearly apparent, and each piston is also provided with an annular packing cup 92 retained in assembled relationship therewith by means of an annular ring 94 fitted over the annular flange 96 on the piston, said packing cup 92 being effective to prevent the escape of air from the cylinder, as will be clearly understood by those skilled in the art.

Each piston 86 abuts at 98 the adjacent end of a brake lever 100, said brake lever being fulcrumed at 102 within the cylinder housing 70 and extending outwardly therefrom for pivotal connection at 104 to the associated brake head 106, said brake head carrying a brake shoe 108 formed and arranged for frictional engagement with a brake disc 110, said brake disc comprising a hub portion 112 secured as at 114 by means of bolt and nut assemblies (Figure 2, right) to the adjacent wheel 18.

It will be clearly apparent to those skilled in the art that actuating fluid will be conveyed through the nozzle 80 on each cylinder housing 70 to the associated cylinder 84 and said fluid will move the pistons 86, 86 apart, said pistons being operative to urge apart the inner ends of the associated brake levers 100, 100 whereby said brake levers will pivot about respective pivot points 102, 102 and will thus urge the friction shoes 108, 108 into frictional engagement with opposite sides of the brake disc 110 and thus decelerate the rotation of the associated wheel and axle assembly 14. After actuation of the brake levers, release will be effected by means of a tension spring 116 connected at opposite ends thereof at 118, 118 to respective of the brake levers 100, 100 inwardly of the pivot points 102, 102, said tension spring being operative to return the levers 100, 100 to normal released position as shown in Figure 7 after actuation as above described.

Each brake head 106 is provided with balancing means generally designated 120 and more fully described in my co-pending application, Serial No. 421,418. The balancing means is no part of the invention herein disclosed and claimed and thus need not be further described inasmuch as its general function will be clearly apparent to those skilled in the art.

Removal of the operating mechanism from each cylinder housing 70 is facilitated by means of an opening 122 in the inboard side thereof as best seen in Figure 7, said opening being closed by a round cover plate 124 secured by the spaced stud bolts 126, 126 to the cylinder housing.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement, a vehicle frame, a supporting wheel and axle assembly, a brake frame supported from said assembly, a torque connection between said vehicle and brake frames, a brake disc driven by said assembly, a pocket formed on said brake frame and defined by a bottom wall and spaced webs upstanding therefrom, a cylinder housing seated on said bottom wall between said webs, said bottom wall and said housing having complementary arcuate contour, spaced lugs on the bottom of said wall projecting forwardly thereof, lugs on said housing embracing each of the first-mentioned lugs and removably secured thereto, readily removable means affording additional securement for said housing with respect to said brake frame, friction means for engagement with opposite sides of said disc, and brake levers fulcrumed in said housing and operatively connected to respective frictions means.

2. In a brake arrangement for a railway car truck, a truck frame, a supporting wheel and axle assembly, a brake frame supported from said assembly adjacent opposite ends thereof, said brake frame having a downwardly offset portion lying in approximately the plane of the axle, a torque connection between said truck and brake frames, a brake disc driven by said assembly, a pocket formed on said offset portion intermediate the ends thereof, said pocket being partially defined by a bottom wall, a cylinder housing seated atop said wall, said bottom wall and said housing having complementary arcuate contour, means on the bottom of said wall projecting forwardly thereof, means on said housing removably secured to the first-mentioned means, readily removable means affording additional securement for said housing with respect to said brake frame, friction means for engagement with opposite sides of said disc, and brake levers fulcrumed in said housing and operatively connected to respective friction means.

3. In a brake arrangement for a railway car truck comprising a truck frame and a supporting wheel and axle assembly, a brake frame supported adjacent opposite ends thereof, said brake frame being downwardly offset intermediate the ends thereof, a torque connection between said truck and brake frames, a brake disc driven by said assembly, a pocket formed on said brake frame intermediate the ends thereof and defined by a bottom wall and spaced webs upstanding therefrom, a cylinder housing seated on said bottom wall between said webs, a lug on the bottom of said wall, lugs on said housing removably secured to the first-mentioned lug, readily removable means affording additional securement for said housing with respect to said brake frame, friction means for engagement with opposite sides of said disc and brake levers fulcrumed in said housing and operatively connected to respective friction means.

4. In a brake arrangement for a railway car truck comprising a truck frame and a supporting wheel and axle assembly, a brake frame supported from said truck adjacent said assembly, a rotatable brake surface on said assembly adjacent said brake frame, a pocket formed on said brake frame and partially defined by a bottom wall, a cylinder housing seated atop said wall, readily removable means securing said housing within said pocket, friction means for engagement with said surface, and actuating means within said housing operatively associated with said friction means.

5. In a brake frame for a railway car truck, a generally C-shaped rigid member comprising torque arms at opposite ends thereof for support from an associated wheel and axle assembly, an integral pocket formed on said member intermediate the ends thereof, said pocket being defined by a bottom wall and spaced webs upstanding therefrom, a cylinder housing seated on said bottom wall between said webs, said housing and said wall being of complementary arcuate contour, means on the bottom of said wall projecting forwardly thereof for connection to said housing, and additional means on said member affording securement for said housing within said pocket.

6. In a brake frame for a railway car truck, a rigid member having an integral pocket defined by a bottom wall and spaced webs upstanding therefrom, said member having means affording support therefor from an associated wheel and axle assembly, a cylinder housing seated on said wall between said webs, said housing and said wall being of complementary arcuate contour, means on the bottom of said wall projecting forwardly thereof for connection to said housing, and means on said member affording additional securement for said housing within said pocket.

7. In a brake frame for a railway car truck, a rigid member having a pocket partially defined by a bottom wall, a cylinder housing removably mounted atop said wall, said member having a torque arm extending upwardly from the portion thereof supporting said pocket.

CARL E. TACK.